May 6, 1930.  E. W. DAVIS  1,757,236
LUBRICANT COMPRESSOR
Filed April 25, 1924
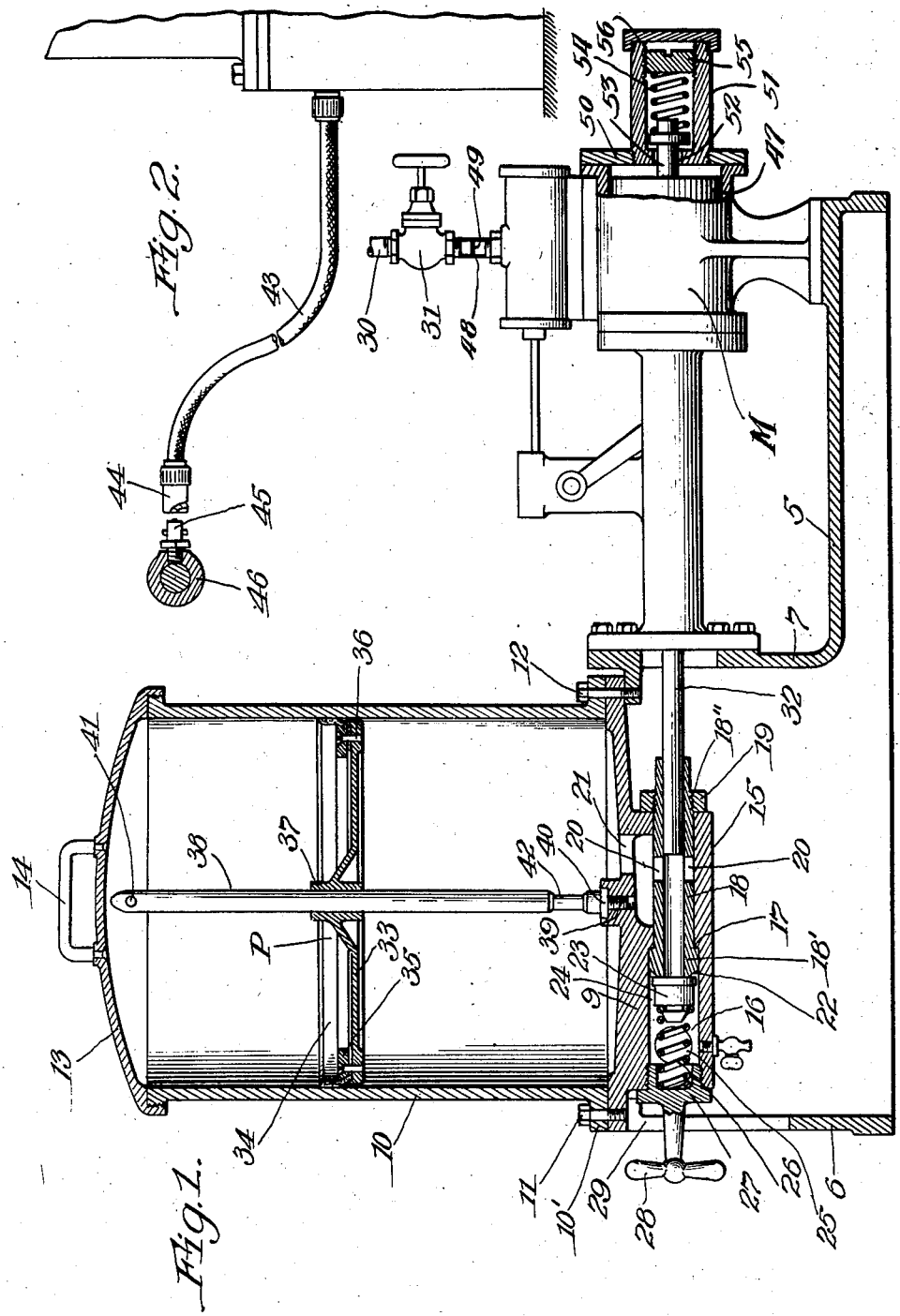
Inventor
Ernest W. Davis
By Earl R. Pierce
Atty.

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICANT COMPRESSOR

Application filed April 25, 1924. Serial No. 708,930.

My invention relates to improvements in lubricant compressors, and is particularly concerned with the provision of a novel type of power operated lubricant compressor for supplying lubricant under pressure to the various bearings of a mechanism. Preferably, this compressor forms part of a so-called high pressure lubricating system consisting of a plurality of fittings, one of which is attached to each of the bearings to be lubricated, and a lubricant compressor having means for successively making sealed connection with the various fittings and supplying lubricant thereto under high pressure.

The objects of my present invention are,

First, to provide a power operated compressor which is simple in construction, economical to manufacture, and easy to operate.

Second, to provide a lubricant compressor of the character described, in which fluid under pressure, and preferably compressed air, is used for actuating the compressor, and Third, to provide a compressor such as described, in which the vibration imparted to the mechanism by the operation of the motor assists in priming the high pressure cylinder of the compressor.

Other objects of my invention will appear as this description progresses, reference being had to the accompanying drawings, in which Figure 1 is a central longitudinal section through a preferred embodiment of my invention, and Figure 2 is an end elevation, portions of the mechanism being broken away.

Referring to the drawings, my improved compressor comprises a suitable base member 5, preferably made of cast iron, and comprising the substantially vertical walls 6, 7 and 8, and another wall opposite 8, but not shown. The opening formed by the upper ends of the aforesaid walls is closed by the closure 9 for the lower end of the barrel 10. The barrel 10 is provided at its lower end with the flange 10' through which suitable bolts 11 and 12 extend for the purpose of securing the barrel to the closure 9 and to the walls mentioned above. The barrel 10 is also provided with a removable closure 13, which is preferably provided with a suitable handle 14.

A substantially cylindrical boss 15 is formed integrally with the closure 9 and depends therefrom. This boss is provided with a bore 16 which extends therethrough, and which is reduced in diameter at its inner end to form the shoulder 17. The high pressure cylinder 18 having the head 18' is inserted through the larger portion of the bore 16 and driven into the smaller portion thereof, where it is secured by means of the nut 19 which is screwed onto the outer threaded end 18'' of the cylinder, and which abuts against the inner end of the boss 15. Openings 20 and 21 formed in the walls of the cylinder 18 and in the closure 9 of the barrel 10, respectively, provide means for establishing communication between the barrel 10 and the cylinder 18.

The outer end of the cylinder 18 is beveled, as shown at 22, to provide a seat for the valve 23. This valve is slidably mounted in the larger portion of the bore 16 and is provided at intervals with lugs 24 that space the valve from the walls of the bore 16 and provide passageways for the passage of lubricant to the outlet opening 25.

The compression spring 26, which is confined between the outer end of the valve 23 and the plug 27, provides means for yieldingly holding the valve 23 upon its seat.

I prefer to provide the plug 27 with a suitable handle 28 extending outwardly through an opening 29 in the wall 6, so as to enable the valve 23 easily to be removed for the purpose of cleaning it and the chamber in which it operates, if this should become desirable.

The motor M, which may be of conventional design, except for the features hereafter described and particularly referred to, and adapted to be actuated by fluids under pressure, and particularly by compressed air, receives its motive fluid through the pipe 30, which is controlled by a suitable valve 31. The piston rod of this motor terminates in a plunger 32, the inner end of which reciprocates in the cylinder 18. The travel of this plunger is such that, when in its retracted position as shown in Figure 1, it clears the ports 20 and thus permits lubricant from the barrel 10 to pass into the cylinder 18. When the plunger 32 is at the opposite end of its stroke, it completely clears the outer end of the cylinder 18 so as to insure the complete discharge of the contents of this cylinder. As the plunger moves toward the position shown in Figure 1, the valve 23 will engage its seat just as soon as the end of the plunger 32 is withdrawn into the cylinder 18. As the plunger continues to withdraw from the cylinder 18, a vacuum is created therein so that when the ports 20 are uncovered, this vacuum will tend to suck lubricant into the cylinder 18 from the barrel 10.

The reciprocation of the moving parts of the motor M communicates a certain amount of vibration to the barrel 10, which tends to cause the lubricant therein to settle toward the bottom of the barrel 10 and to flow through the opening 21 and the openings 20 into the cylinder 18. In this manner, a supply of lubricant to the cylinder 18 is practically insured. However, to make certain that there will be no failure in the supply of lubricant to the cylinder 18, I provide the piston or follower P which comprises the face plate 33 to which a strip of leather 34, bent in the form of a ring with overlapping ends, is secured by means of the ring 35 and the rivets or screws 36. In this manner, I am able to provide the equivalent of a cup leather, but at a fraction of the cost of a cup leather.

The face plate 33 is provided with a hub 37 which is slidably mounted upon the rod 38. The inner end of this rod is screw threaded, as shown at 39, to provide a detachable connection between it and the closure 9. Adjacent its inner end, the rod 38 is provided with a flange 40 which is adapted to engage the inner end of the hub 37 to enable the operator to withdraw the piston P from the barrel 10 when the piston P has completed its inward movement. A rod 41 extending transversely through the outer end of the rod 38 facilitates the removal of this rod from the barrel 10.

An elongated groove 42 is formed in the rod 38 adjacent its inner end to provide means for venting the inner face of the piston P to atmosphere so as to break any vacuum that would tend to form when the piston P is being withdrawn from the barrel 10.

A flexible hose or conduit 43 is connected with the outlet or discharge opening 25. This hose terminates in a coupling member 44 of well-known construction for making sealed connection with a fitting 45, also of well-known construction, which is here illustrated as being mounted upon a bearing 46.

It is believed that the operation of my improved compressor will be apparent from the above description. When the valve 31 is opened, the fluid under pressure will enter the cylinder of the motor M and cause the plunger 23 to reciprocate, thereby successively discharging charges of lubricant from the cylinder 18 through the conduit 43 and coupling 44 into the fittings. The coupling 44 is preferably of the valved type, that is, it is provided with a valve which automatically opens when the coupling 44 is attached to a fitting 45, and closes when the coupling is removed from the fitting. Any other suitable means may be employed for controlling the flow of lubricant through the conduit 43.

When this control means, whatever it may be, is positioned to prevent the flow of lubricant through the conduit 43, the plunger 32 will merely come to rest until the valve or control means is again opened. The arrangement just described is particularly suitable for use with compressed air or other gas, because no undue strain is placed upon the mechanism when the passage of lubricant through the conduit 43 is restrained.

The apparatus thus far described will operate in a very satisfactory manner, and particularly so if the motor is not required to operate at too high a speed. If, however, the speed is increased beyond a certain limit, which is determined principally by the size of the ports 20 and 21, and the viscosity of the lubricant, the plunger 32 will, after uncovering the ports 20 to permit the passage of lubricant into the high pressure cylinder, reverse its direction of travel and move past the ports 20 so quickly that the lubricant will not have opportunity completely to fill the high pressure cylinder. To correct this difficulty, I have provided means which slows down or stops the motion of the piston 47 of the motor M immediately after the plunger 32, in its return stroke, has uncovered the ports 20 and just before this plunger reverses its direction of movement. It will be understood that upon the return stroke of the plunger 32 and the piston 47, practically no resistance is offered to the movement of these two elements and comparatively little pressure is required to move them through this stroke.

My invention, therefore, contemplates placing a diaphragm 48 in the supply pipe 30, which is provided with a small opening 49, thereby introducing a certain amount of resistance tending to oppose the passage of the motive fluid, such as steam or air, into the motor. I also secure to the head 50 of the motor cylinder an auxiliary cylinder 51 having the opening 52 at its inner end communicating with the cylinder of the motor. A plunger 53 is located in the cylinder 51 and extends a short distance into the cylinder of the motor M. A spring 54, confined between the plunger 53 and the adjustable plug 55, provides means for yieldingly opposing the last portion of the return stroke of the piston 47 and the plunger 32. By adjusting the plug inwardly or outwardly, the tension of the spring 54 can be varied so as to suit the varying conditions under which the compressor may operate. If desired, a cap 56 may be provided for closing the outer end of the cylinder 51.

When my improved compressor is provided with the construction just described, the return stroke of the piston 47 and plunger 32 is quite rapid until the piston 47 engages the plunger 53, whereupon the piston 47 stops until sufficient motive fluid has passed through the small opening 49 into the left hand side of the piston 47 to overcome the tension of the spring 54, whereupon the piston 47 and plunger 32 complete the return stroke and then move forward under the pressure of the motive fluid in the direction to discharge lubricant from the high pressure cylinder. It will be seen from this description that I have provided means for arresting the return stroke of the plunger 32 at the point where it will permit lubricant to be discharged from the barrel 10 into the high pressure cylinder. The period during which the movement of this plunger is arrested can be varied by varying the size of the opening 49, or the tension of the spring 54, or by varying both of these elements. It can also, of course, be varied by varying the pressure of the motive fluid.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A lubricant compressor comprising a barrel having a removable cover at its upper end, and a closure at its lower end, a cylinder removably secured to said closure, said closure and cylinder having communicating ports for establishing communication between said barrel and said cylinder, a valve seating against one end of said cylinder, a spring for yieldingly holding said valve against the end of said cylinder, a plunger extending through the other end of said cylinder, a motor for reciprocating said plunger, a rod extending throughout substantially the entire length of said barrel and having its inner end detachably secured to said closure, and a piston slidable on said rod.

2. A lubricant compressor comprising a barrel having a removable cover at its upper end, and a closure at its lower end, a cylinder removably secured to said closure, said closure and cylinder having communicating ports for establishing communication between said barrel and said cylinder, a valve for preventing return flow to said cylinder, a plunger extending through the other end of said cylinder, a motor for reciprocating said plunger, and means for retarding the return stroke of said plunger.

3. A lubricant compressor comprising a barrel, a cylinder communicating therewith, a plunger reciprocable in said cylinder, a motor for reciprocating said plunger, and automatic means for retarding the movement of said motor, for a portion of its movement, to permit lubricant to be discharged from said barrel into said cylinder.

4. A lubricant compressor comprising a barrel, a cylinder communicating therewith, a plunger reciprocable in said cylinder, a motor for reciprocating said plunger, and automatic means for controlling the movement of said plunger to insure the communication between said cylinder and barrel remaining open a sufficient length of time to permit lubricant to pass from said barrel into said cylinder.

5. Compressing means comprising a cylinder having an intake port, a plunger movable to uncover said port, automatic resiliently driven means for reciprocating said plunger, and means for retarding the movement of said reciprocating means and plunger when said port is open.

6. Compressing means comprising a cylinder having an intake port, a plunger movable to uncover said port, automatic resiliently driven means for reciprocating said plunger, and means for retarding the movement of said reciprocating means and plunger when said port is open, said means comprising a resilient cushion resisting movement near the end of the stroke uncovering said port.

7. Compressing means comprising a cylinder having an intake port, a plunger movable to uncover said port, fluid pressure means for reciprocating said plunger, and means for retarding the movement of said fluid pressure means and plunger when said port is open, said retarding means comprising a resilient cushion resisting movement near the end of the stroke uncovering said port, and fixed throttling means for the pressure fluid.

8. Compressing means comprising a cylinder having an intake port, a plunger movable to uncover said port, fluid pressure means for reciprocating said plunger, and means for retarding the movement of said fluid pressure means and plunger when said port is open, said retarding means comprising a resilient cushion resisting movement near the end of the stroke uncovering said port, and fixed throttling means for the pressure fluid, said cushion stopping movement temporarily until said throttling means permits building up a pressure to carry the parts on into the next stroke.

In witness whereof, I hereunto subscribe my name this 16th day of April, 1924.

ERNEST W. DAVIS.